C. VIGNERON.
MACHINE FOR MOLDING GLASS BUTTONS.
No. 102,070. Patented Apr. 19, 1870.
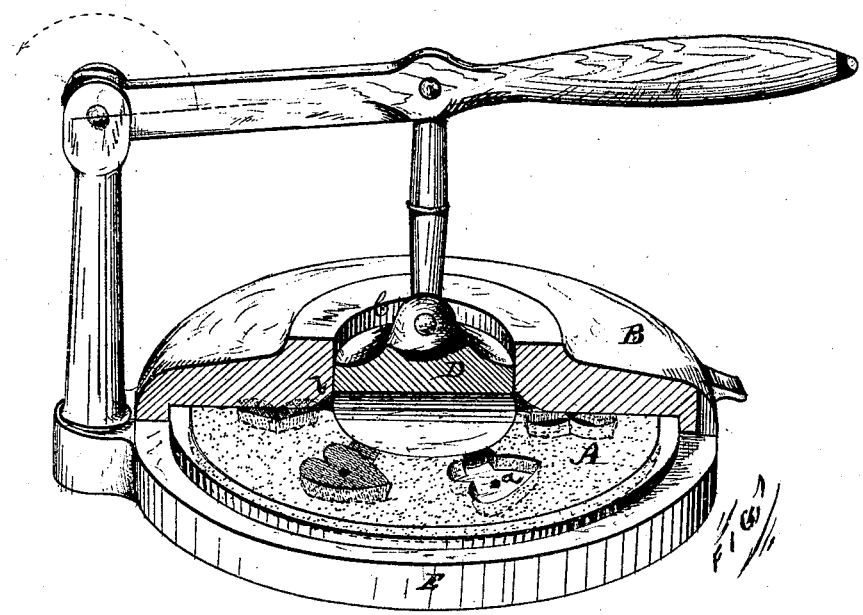
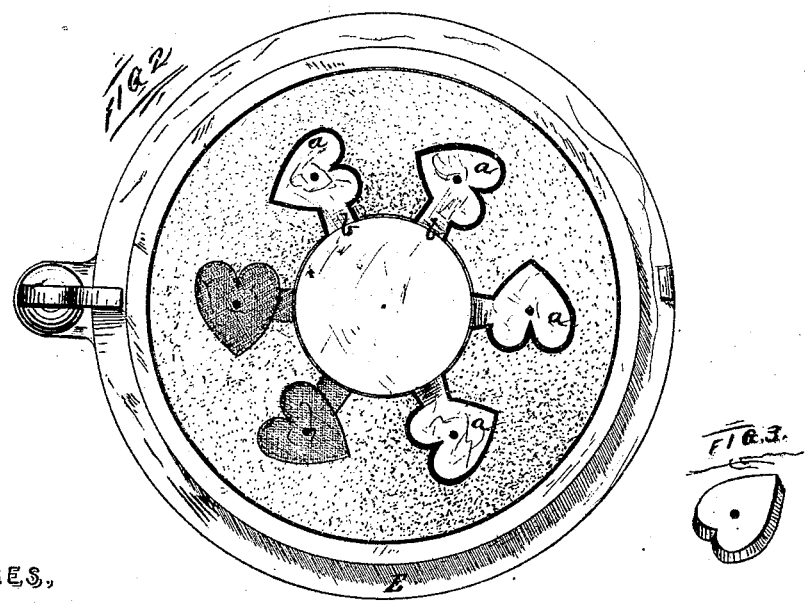
WITNESSES,
Edward C. Ames
Orville Peckham
INVENTOR,
Charles Vigneron

United States Patent Office.

CHARLES VIGNERON, OF PROVIDENCE, RHODE ISLAND.

Letters Patent No. 102,070, dated April 19, 1870.

IMPROVED MACHINE FOR MOLDING GLASS BUTTONS.

The Schedule referred to in these Letters Patent and making part of the same.

*To all whom it may concern:*

Be it known that I, CHARLES VIGNERON, of the city and county of Providence, and State of Rhode Island, have invented an Improved Apparatus for Molding under Pressure; and I do hereby declare that the following specification, taken in connection with the drawings making a part of the same, is a full, clear, and exact description thereof.

The apparatus is specially designed for use in molding glass ornaments for sleeve-buttons, studs, and other similar purposes.

Figure 1 is a view in perspective, with a portion of the mold cut away.

Figure 2 is a top view of the lower matrix-plate.

Figure 3 represents one of the articles molded by the apparatus.

A is a matrix-plate, in the face of which is sunk a series of matrices, *a*, of the form of the article to be made.

B is a top plate or flask-cover, which is fitted to cover the matrix-bed, and should be so arranged that it can be clamped to the latter.

In the center of the top plate is an opening, C, into which the molten glass is to be poured, and a piston, D, is arranged to fit nicely therein. This piston is worked by a lever, as shown, or in any other convenient way which will enable pressure to be applied to it.

Ducts, *b b*, cut either in the top plate or in the matrix-bed, as preferred, connect the central space C with each of the matrices.

E represents the bed-plate or base of the mold. Its upper surface is provided with an annular space or recess for the reception of the matrix-bed A.

The two parts of the mold having been clamped together, the piston is raised, and, while the glass which is poured into the mold is in plastic state, pressure is applied to the piston, and the glass is forced into the matrices. When cooled, the articles so molded can readily be detached from the metal which fills the ducts, and be finished in the usual way.

What I claim as my invention, and desire to secure by Letters Patent, is—

The combination of the bed-plate E and flask-cover B with the detachable matrix-bed A, and the piston D fitted to the flask-cover and operated by pressure, substantially as described.

CHARLES VIGNERON.

Witnesses:
 EDWARD C. AMES,
 ORVILLE PECKHAM.